No. 78,086. PATENTED MAY 19, 1868.

W. A. HEATH.
HORSE HAY RAKE.

WITNESSES.
Alex F. Roberts

INVENTOR
W. A. Heath
per Munn & Co.
Attorneys

United States Patent Office.

WATSON A. HEATH, OF APALACHIN, NEW YORK.

Letters Patent No. 78,086, dated May 19, 1868.

IMPROVEMENT IN HORSE HAY-RAKES.

*The Schedule referred to in these Letters Patent and making part of the same.*

TO ALL WHOM IT MAY CONCERN:

Be it known that I, WATSON A. HEATH, of Apalachin, in the county of Tioga, and State of New York, have invented a new and improved Horse Hay-Rake; and I do hereby declare that the following is a full, clear, and exact description thereof, which will enable others skilled in the art to make and use the same, reference being had to the accompanying drawings, forming a part of this specification, in which—

Similar letters of reference indicate corresponding parts.

My invention has for its object to improve the construction of revolving hay-rakes, so as to make them more convenient and effective in operation; and it consists in the construction and combination of various parts of the rake, as hereinafter more fully described.

Figure 1:
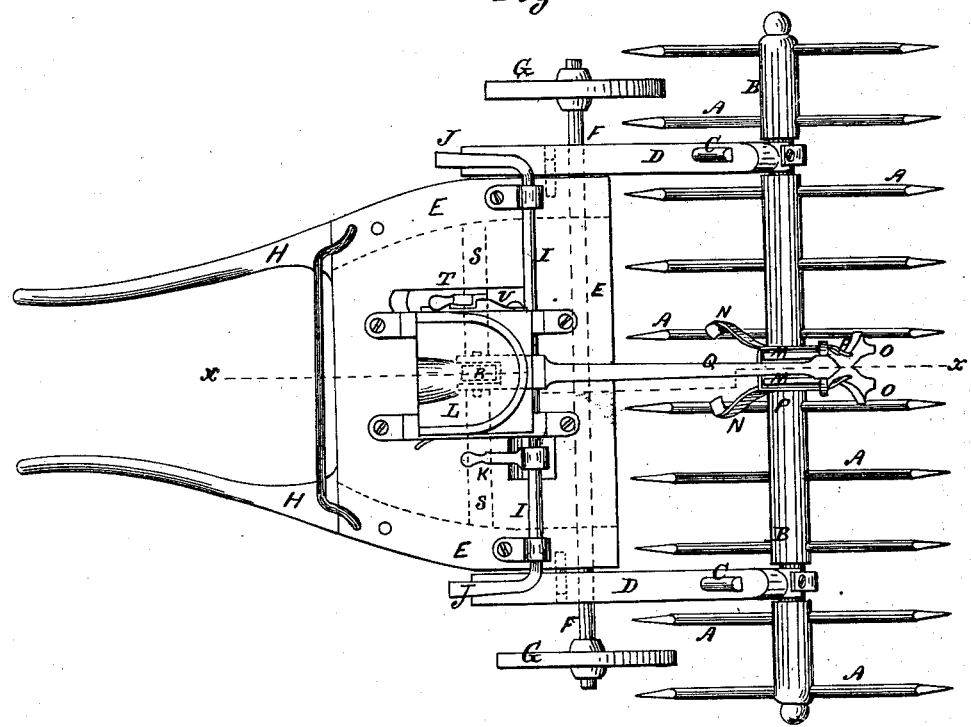
Figure 1 is a top or plan view of my improved rake.
Figure 2:
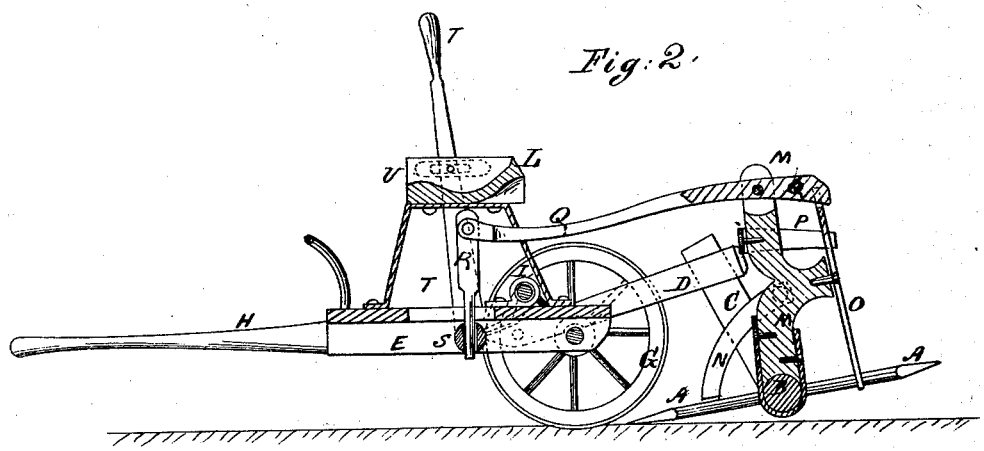
Figure 2 is a vertical section of the same, taken through the line $x\ x$, fig. 1.

A are the rake-teeth, which are made and attached to the shaft B in the ordinary manner. The shaft B is connected with and revolves upon the lower ends of the standards C in the ordinary manner. The upper ends of the standards C are rigidly attached to the rear ends of the draught-bars D, in a slightly inclined position, as shown in figs. 1 and 2. The forward parts of the draught-bars D are pivoted to the sides of the frame E by screws, bolts, or pins, at a little distance from their ends, so that the said bars may serve as levers to raise the rake-head away from the ground for convenience in moving the rake from place to place.

The frame E is securely attached to the axle F of the wheels G, and to its forward side are attached the shafts H.

I is a shaft working in bearings upon the upper side of the frame E, and having arms J formed upon or attached to its ends, and extending out at right angles to the length of said shaft, so that when the shaft I is revolved, the arms J may act upon the forward ends of the draught-bars D to raise the rake-head away from the ground. K is a hand-lever or bar, the lower end of which is securely attached to the shaft I, so that by operating the said hand-lever K the rake-head may be raised from the ground, as required. The lever K is held in place, when lowered to raise the rake-head, by a catch formed upon the front left-hand standard that supports the driver's seat L.

M is a standard, the lower end of which rides upon and is secured to the middle part of the rake-head shaft B, in the same manner as the standards C are secured to said shaft. To the sides of the standard M are attached the rear ends of two spring-braces, N, which extend forward and downward, so that their lower ends may serve as stops to check the revolution of the rake-head, when, in discharging the collected hay, it has revolved into a proper working position. To the rear side of the standard M are pivoted two lever-stops, O, the upper ends of which are held together by the U or other shaped spring or springs P, so as to spread the lower ends of said levers and hold them in proper position to rest upon the two central teeth of the rake-head, and hold said rake-head in proper working position. The lower ends of the levers O are drawn together to allow the rake-head to revolve to discharge the collected hay, by forcing the upper ends of said levers O apart, by means of the wedge or V-shaped head of the lever Q.

The lever Q is pivoted in a slot or notch in the upper end of the standard M, and its forward end is pivoted to the upper end of the arm R, the lower end of which is connected to the shaft S, which works in bearings attached to the frame E.

T is a hand-lever, the lower end of which is rigidly attached to the shaft S, and the upper end of which extends up at the right-hand side of the driver's seat L, where it is held in place by an adjustable catch, U, secured to the side of the seat L by screws passing through slots in the said catch, so that it may be adjusted to hold the hand-lever T in the desired position.

Having thus described my invention, what I claim as new, and desire to secure by Letters Patent, is—

1. The combination of the hand-lever T, shaft S, standard R, and lever Q with each other, and with the frame E, standard M, and lever-stops O, substantially as herein shown and described, and for the purpose set forth.

2. Pivoting the draught-bars D, of the rake, to the frame E, at points a short distance from the ends of said draught-bars, so that they may serve as levers in raising the rake-head from the ground, substantially as herein shown and described.

3. The combination of the hand-lever K, shaft I, and arms J, with the frame E and forward ends of the pivoted draught-bars D, substantially as herein shown and described, and for the purpose set forth.

The above specification of my invention signed by me, this 19th day of February, 1868.

WATSON A. HEATH.

Witnesses:
LEWIS BUFFUM,
G. W. BUFFUM.